US012463316B2

(12) United States Patent
Li

(10) Patent No.: US 12,463,316 B2
(45) Date of Patent: Nov. 4, 2025

(54) ELECTRONIC DEVICE AND ANTENNA ASSEMBLY

(71) Applicants: INVENTEC (PUDONG) TECHNOLOGY CORPORATION, Shanghai (CN); INVENTEC CORPORATION, Taipei (TW)

(72) Inventor: Chih-Cheng Li, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 211 days.

(21) Appl. No.: 18/236,888

(22) Filed: Aug. 22, 2023

(65) Prior Publication Data

US 2024/0413517 A1 Dec. 12, 2024

(30) Foreign Application Priority Data

Jun. 6, 2023 (CN) ......................... 202310659549.0

(51) Int. Cl.
*H01Q 1/22* (2006.01)
*H01Q 13/10* (2006.01)

(52) U.S. Cl.
CPC ............... *H01Q 1/22* (2013.01); *H01Q 13/10* (2013.01)

(58) Field of Classification Search
CPC .. H01Q 1/22; H01Q 1/42; H01Q 1/52; H01Q 1/526
See application file for complete search history.

(56) References Cited

U.S. PATENT DOCUMENTS

| | | | | |
|---|---|---|---|---|
| 12,074,368 | B2 * | 8/2024 | Larsen | H01Q 1/243 |
| 2011/0044019 | A1 * | 2/2011 | Hankui | H05K 9/0032 361/818 |
| 2015/0042528 | A1 * | 2/2015 | Jung | H01Q 1/523 343/841 |
| 2015/0061958 | A1 * | 3/2015 | Huang | H01Q 1/526 343/841 |
| 2017/0212554 | A1 * | 7/2017 | Guterman | G06F 1/1681 |
| 2019/0356051 | A1 * | 11/2019 | Barrera | H01Q 1/44 |
| 2020/0036086 | A1 * | 1/2020 | Yazaki | H01Q 1/243 |
| 2020/0243947 | A1 * | 7/2020 | Yamamoto | H01Q 1/526 |
| 2020/0274239 | A1 * | 8/2020 | Amano | H01Q 1/2266 |
| 2021/0175606 | A1 * | 6/2021 | Ramasamy | H01Q 1/52 |
| 2021/0175610 | A1 * | 6/2021 | Ramasamy | H01Q 1/2266 |

(Continued)

*Primary Examiner* — Jason M Crawford
(74) *Attorney, Agent, or Firm* — Maschoff Brennan

(57) ABSTRACT

An electronic device includes a casing, a motherboard, a noise source and an antenna assembly. The motherboard is located in the casing. The noise source is disposed on the motherboard. The antenna assembly includes an antenna and a covering shield. The antenna is electrically connected to the motherboard and located close to the casing and has a radiation portion. The covering shield is fixed to the casing and located between the antenna and the noise source. The covering shield forms a covering space, a first opening and a second opening, the first opening and the second opening are located at different sides of the covering space, the first opening is covered by the casing and located close to the antenna, the second opening is located close to the radiation portion, and the second opening and the noise source are respectively located at different sides of the covering shield.

6 Claims, 3 Drawing Sheets

(56) References Cited

U.S. PATENT DOCUMENTS

| | | | | |
|---|---|---|---|---|
| 2022/0200154 | A1* | 6/2022 | Thakur | H05K 1/0237 |
| 2022/0294109 | A1* | 9/2022 | Larsen | H01Q 9/42 |
| 2023/0413498 | A1* | 12/2023 | Takahashi | H01Q 1/22 |
| 2024/0030587 | A1* | 1/2024 | Huang | H01Q 1/2266 |
| 2024/0407144 | A1* | 12/2024 | Tai | H05K 9/0028 |
| 2024/0413517 | A1* | 12/2024 | Li | H01Q 1/526 |

* cited by examiner

ELECTRONIC DEVICE AND ANTENNA ASSEMBLY

CROSS-REFERENCE TO RELATED APPLICATIONS

This non-provisional application claims priority under 35 U.S.C. § 119 (a) on Patent Application No(s). 202310659549.0 filed in China, on Jun. 6, 2023, the entire contents of which are hereby incorporated by reference.

BACKGROUND OF THE INVENTION

Technical Field of the Invention

The invention relates an antenna assembly and an electronic device including the same.

Description of the Related Art

In order to prevent an antenna in an electronic device from being interfered by noise generated by other electronic components, the existing solution is to block the interference of the noise by using a metal casing to completely seal the surroundings of the antenna.

However, this solution may overly increase the gain of the antenna, and the omnidirectional radiation performance index of the antenna will be poor, which causes the need for more antennas to compensate for the radiation pattern. In addition, the antenna may not satisfy relevant regulations due to high gain of the antenna.

SUMMARY OF THE INVENTION

The invention provides an electronic device and an antenna assembly which is capable of preventing the antenna from being interfered by noise while reducing the gain of the antenna.

One embodiment of the invention provides an electronic device. The electronic device includes a casing, a motherboard, a noise source and an antenna assembly. The motherboard is located in the casing. The noise source is disposed on the motherboard. The antenna assembly includes an antenna and a covering shield. The antenna is electrically connected to the motherboard and located close to the casing, and the antenna has a radiation portion. The covering shield is fixed to the casing and at least partially located between the antenna and the noise source. The covering shield surrounds and forms a covering space, a first opening and a second opening, the first opening and the second opening are respectively located at different sides of the covering space, the first opening is covered by the casing and located close to the antenna, the second opening is located close to the radiation portion of the antenna, and the second opening and the noise source are respectively located at different sides of the covering shield.

Another embodiment of the invention provides an antenna assembly. The antenna assembly is configured to be mounted on a casing. The antenna assembly includes an antenna and a covering shield. The antenna is configured to be located close to the casing and has a radiation portion. The covering shield is configured to be fixed to the casing, the covering shield surrounds and forms a covering space, a first opening and a second opening, the first opening and the second opening are respectively located different sides of the covering space, and the first opening is configured to be covered by the casing and located close to the antenna, and the second opening is located close to the radiation portion of the antenna.

According to the electronic device and the antenna assembly as discussed in the above embodiments, the covering shield is further provided with the second opening located close to the radiation portion of the antenna, but the second opening and the noise source are respectively located at two adjacent sides of the covering shield, such that the gain of the antenna can be reduced while the covering shield can still provide a desired effect of shielding noise generated by the noise source.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
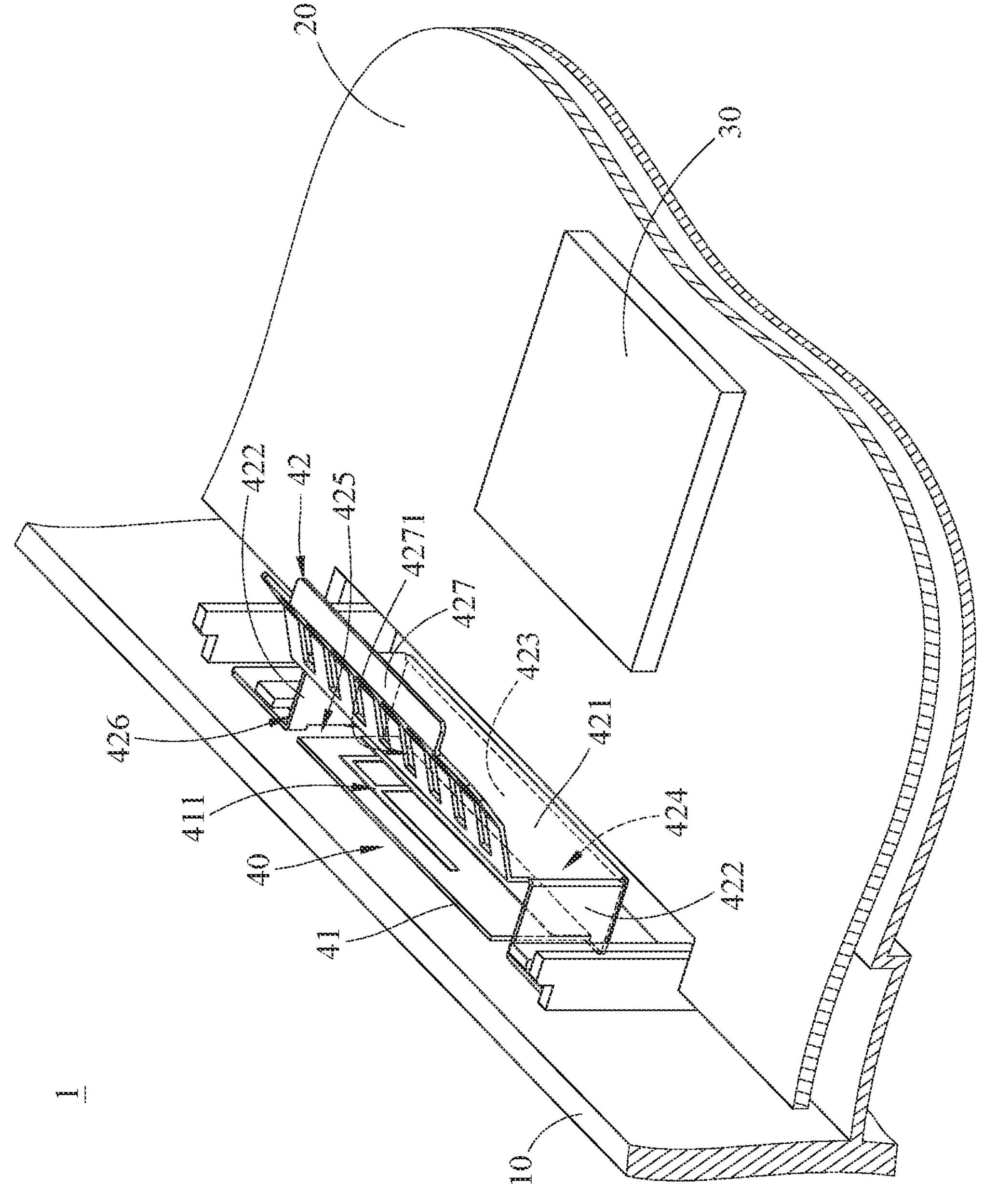
FIG. 1 is a partially perspective view of an electronic device according to a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
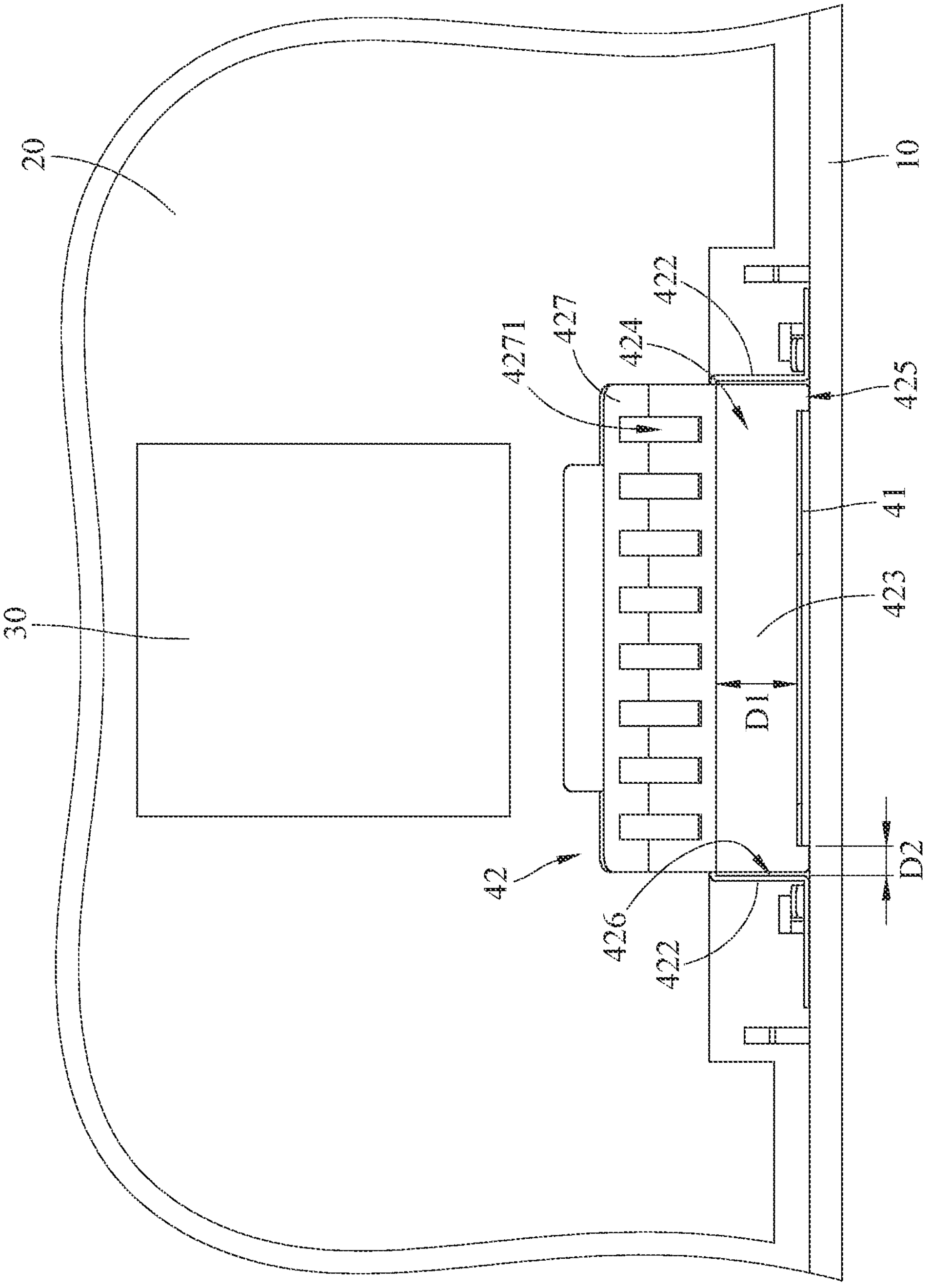
FIG. 2 is a partially top view of the electronic device in FIG. 1.

Referring to FIGS. 1 and 2, FIG. 1 is a partially perspective view of an electronic device 1 according to a first embodiment of the invention, and FIG. 2 is a partially top view of the electronic device 1 in FIG. 1.

In this embodiment, the electronic device 1 is, for example, a laptop computer or a desktop computer. The electronic device includes a casing 10, a motherboard 20, a noise source 30 and an antenna assembly 40. The electronic device 1 may further include other components, such as hard disk drives, fans and so on, but in order to clearly show the connection relationship among the casing 10, the motherboard 20, the noise source 30 and the antenna assembly 40, the aforementioned components of the electronic device 1 are omitted in the figures. In addition, the figures merely show a part of the casing 10, but it can be understood that the casing 10 is a housing surrounding and forming an accommodation space for accommodating the motherboard 20, the noise source 30, the antenna assembly 40 and other components.

In this embodiment, the motherboard 20 is located in the casing 10, and the noise source 30 is disposed on the motherboard 20.

The antenna assembly 40 includes an antenna 41 and a covering shield 42. The antenna 41 is, for example, a circuit board antenna 41. The antenna 41 is electrically connected to the motherboard 20, for example, via a cable (not shown). The antenna 41 is located close to the casing 10, and the antenna 41 has a radiation portion 411.

The covering shield 42 includes a first wall 421, two second walls 422 and a third wall 423. The two second walls 422 and the third wall 423 are respectively connected to different sides of the first wall 421, and the two second walls 422 are located opposite to each other and located adjacent to the third wall 423. The first wall 421, the two second walls 422 and the third wall 423 together form a covering space 424, a first opening 425 and a second opening 426, and the first opening 425 and the second opening 426 are respectively located at two adjacent sides of the covering space 424. The two second walls 422 are fixed to the casing 10. The first opening 425 is located adjacent to the antenna 41 and is covered by the casing 10. The second opening 426 is located adjacent to the radiation portion 411 of the antenna 41 and located opposite to the third wall 423, and the second opening 426 and the noise source 30 are respectively located at adjacent sides of the covering shield 42.

In this embodiment, the covering shield 42 may further include a ground sheet 427. The ground sheet 427 is connected to the first wall 421 and extends away from the casing 10. The ground sheet 427 is configured for grounding for conducting noise away. The ground sheet 427 has a plurality of vent holes 4271 for preventing the ground sheet 427 from interfering with a heat dissipation airflow. Note that the ground sheet 427 is optional component; in some other embodiment, the covering shield may not include the ground sheet, but may include another structure or component for grounding.

In this embodiment, the covering shield 42 is further provided with the second opening 426 located close to the radiation portion 411 of the antenna 41, but the second opening 426 and the noise source 30 are respectively located at two adjacent sides of the covering shield 42, such that the gain of the antenna 41 can be reduced while the covering shield 42 can still provide a desired effect of shielding noise generated by the noise source 30. Therefore, the covering shield 42 can reduce noise and prevent the radiation pattern of the antenna 41 from being overly concentrated so as to achieve an omnidirectional radiation pattern of the antenna 41 and maintain the performance of the antenna 41.

In this embodiment, a distance D1 between the antenna 41 and the first wall 421 is, for example, larger than or equal to 6 mm, and a distance D2 between the antenna 41 and each of the second walls 422 is, for example, larger than or equal to 2 mm. As a result, the aforementioned efficacies can be further improved so as to achieve the omnidirectional radiation in the WIFI 6e frequency band, and the effect of shielding radio frequency interference (i.e., RFI) can reach at least 10 dB.

Note that the distance D1 between the antenna 41 and the first wall 421 and the distance D2 between the antenna 41 and each of the second walls 422 are not restricted in the invention and may be modified as actual requirements.

Note that the third wall 423 is an optional structure. The third wall of the covering shield may be omitted when the covering shield without the third wall can still satisfy the requirement of noise shielding.

Note that the second opening 426 and the noise source 30 are not restricted to being located at two adjacent sides of the covering shield 42; in some other embodiments, the second opening and the noise source may be located at two opposite sides of the covering shield. For example, the second opening may be located at the top side of the covering shield, and the noise source may be located at the bottom side of the covering shield. In a case that the noise source is located at the bottom side of the covering shield, the second opening may be located at another side of the covering shield and located opposite to the first opening.

Figure 3:
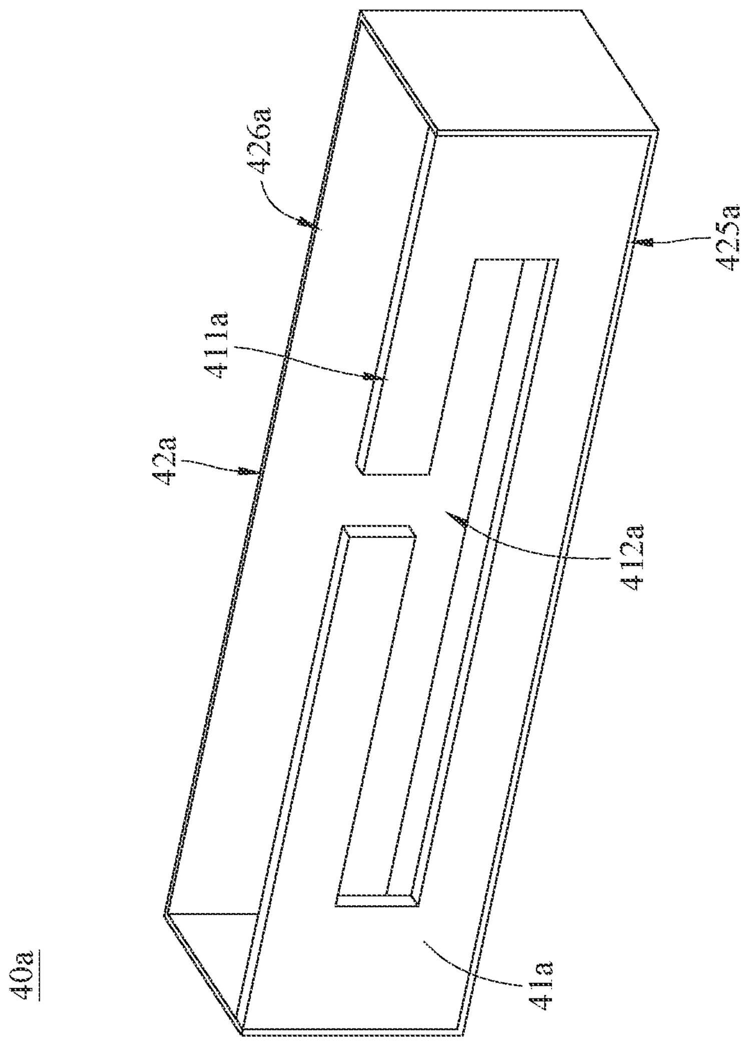
FIG. 3 is a perspective view of an antenna assembly according to a second embodiment of the invention.

Then, referring to FIG. 3, FIG. 3 is a perspective view of an antenna assembly 40*a* according to a second embodiment of the invention.

The antenna assembly 40*a* of this embodiment is similar to the antenna assembly 40 of the previous embodiment, and the difference between them is mainly the type of the antenna. Therefore, the following paragraphs mainly introduce an antenna 41*a* of the antenna assembly 40*a* of this embodiment, and the similar or same part between them will not be repeatedly introduced hereinafter.

In this embodiment, the antenna 41*a* of the antenna assembly 40*a* is, for example, a slot antenna. The antenna 41*a* is located at a first opening 425*a* of a covering shield 42*a*, and a second opening 426*a* of the covering shield 42*a* is located adjacent to a radiation portion 411*a* of the antenna 41*a*, and a slot 412*a* of the antenna 41*a* is connected to the second opening 426*a* of the covering shield 42*a*.

According to the electronic device and the antenna assemblies as discussed in the above embodiments, the covering shield is further provided with the second opening located close to the radiation portion of the antenna, but the second opening and the noise source are respectively located at two adjacent sides of the covering shield, such that the gain of the antenna can be reduced while the covering shield can still provide a desired effect of shielding noise generated by the noise source. Therefore, the covering shield can reduce noise and prevent the radiation pattern of the antenna from being overly concentrated so as to achieve an omnidirectional radiation pattern of the antenna and maintain the performance of the antenna.

In this embodiment, a distance between the antenna and the first wall is larger than or equal to 6 mm, and a distance between the antenna and each of the second walls is larger than or equal to 2 mm. As a result, the aforementioned efficacies can be further improved so as to achieve the omnidirectional radiation in the WIFI 6e frequency band, and the effect of shielding radio frequency interference (i.e., RFI) can reach at least 10 dB.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. An electronic device, comprising:

a casing;

a motherboard, located in the casing;

a noise source, disposed on the motherboard; and an antenna assembly, comprising:

an antenna, electrically connected to the motherboard and located close to the casing, wherein the antenna has a radiation portion; and a covering shield, fixed to the casing and at least partially located between the antenna and the noise source, wherein the covering shield surrounds and forms a covering space, a first opening and a second opening, the first opening and the second opening are respectively located at different sides of the covering space, the first opening is covered by the casing and located close to the antenna, the second opening is located close to the radiation portion of the antenna, and the second opening and the noise source are respectively located at different sides of the covering shield;

wherein the covering shield comprises a first wall and two second walls, the two second walls are respectively connected to two opposite sides of the first wall and fixed to the casing, the first wall and the two second walls together surround and form the covering space, the first opening and the second opening, the first opening and the second opening are respectively located at two adjacent sides of the covering space, and the second opening and the noise source are respectively located at two adjacent sides of the covering shield;

wherein the covering shield further comprises a ground sheet, the ground sheet is connected to the first wall and extends away from the casing, and the ground sheet has a plurality of vent holes.

2. The electronic device according to claim 1, wherein a distance between the antenna and the first wall is larger than or equal to 6 mm.

3. The electronic device according to claim 1, wherein the antenna is a circuit board antenna, and a distance between the antenna and each of the two second walls is larger than or equal to 2 mm.

4. The electronic device according to claim 1, wherein the covering shield further comprises a third wall, the third wall and the two second walls are respectively connected to different sides of the first wall, and the third wall is located opposite to the second opening.

5. An antenna assembly, configured to be mounted on a casing, comprising:

an antenna, configured to be located close to the casing and having a radiation portion; and a covering shield, configured to be fixed to the casing, wherein the covering shield surrounds and forms a covering space, a first opening and a second opening, the first opening and the second opening are respectively located different sides of the covering space, and the first opening is configured to be covered by the casing and located close to the antenna, and the second opening is located close to the radiation portion of the antenna;

wherein the covering shield comprises a first wall and two second walls, the two second walls are respectively connected to two opposite sides of the first wall and are configured to be fixed to the casing, the first wall and the two second walls together surround and form the covering space, the first opening and the second opening, the first opening and the second opening are respectively located at two adjacent sides of the covering space;

wherein the covering shield further comprises a ground sheet, the ground sheet is connected to the first wall and extends away from the casing, and the ground sheet has a plurality of vent holes.

6. The antenna assembly according to claim 5, wherein a distance between the antenna and the first wall is larger than or equal to 6 mm.

* * * * *